United States Patent [19]

Fetzer

[11] Patent Number: 4,678,643
[45] Date of Patent: Jul. 7, 1987

[54] APPARATUS FOR CATALYTIC CLEANING OF EXHAUST GASES FROM A FURNACE SYSTEM

[75] Inventor: Wolfgang Fetzer, Heidelberg, Fed. Rep. of Germany

[73] Assignee: Svenska Rotor Maskiner Aktiebolag, Stockholm, Sweden

[21] Appl. No.: 769,630
[22] PCT Filed: Feb. 21, 1985
[86] PCT No.: PCT/EP85/00063
  § 371 Date: Aug. 16, 1985
  § 102(e) Date: Aug. 16, 1985
[87] PCT Pub. No.: WO85/03645
  PCT Pub. Date: Aug. 29, 1985

[30] Foreign Application Priority Data
  Feb. 24, 1984 [DE] Fed. Rep. of Germany ....... 3406657

[51] Int. Cl.[4] .............................................. B01J 8/10
[52] U.S. Cl. ........................................ 422/175; 165/8; 422/178; 422/180; 422/206
[58] Field of Search ................... 165/7, 8; 423/244 R; 422/171, 174, 177, 180, 178, 175, 206

[56] References Cited
U.S. PATENT DOCUMENTS

| | | | |
|---|---|---|---|
| 3,362,783 | 1/1968 | Leak | 422/180 |
| 3,607,133 | 9/1971 | Hirao | 422/180 |
| 3,755,534 | 8/1973 | Graham | 422/180 |
| 3,780,498 | 12/1973 | Wenner | 165/7 |
| 3,997,294 | 12/1976 | Kritzler | 422/175 |
| 4,003,979 | 1/1977 | Kanno | 423/247 |
| 4,039,478 | 8/1977 | Cull et al. | 423/244 R |
| 4,129,176 | 12/1978 | Heyn et al. | 165/7 |

FOREIGN PATENT DOCUMENTS 2027609 2/1980 United Kingdom .
1602812 11/1981 United Kingdom .

Primary Examiner—Michael S. Marcus
Attorney, Agent, or Firm—Frishauf, Holtz, Goodman and Woodward

[57] ABSTRACT

Apparatus for catalytic cleaning of the exhaust gases of furnace systems. For selectively eliminating nitrogen oxides in the exhaust gases of furnace systems, chemical compounds, such as ammonia in vapor form, are introduced into the exhaust gases emerging from the furnace systems. The exhaust gases are then passed through a catalytic converter, which initiates and/or accelerates the reaction of the oxides of nitrogen with the admixed chemical compounds. In different zones in the catalytic converter, the exhaust gases that are to be treated catalytically and of at least one current of cleaning gas are passed in a countercurrent. The location of the catalyst zones through which the exhaust gases and the cleaning gas, respectively, flow is varied continuously or intermittently. The catalytic converter has catalyst elements disposed in a carrier, and the carrier and the gas connections relative to one another.

23 Claims, 3 Drawing Figures

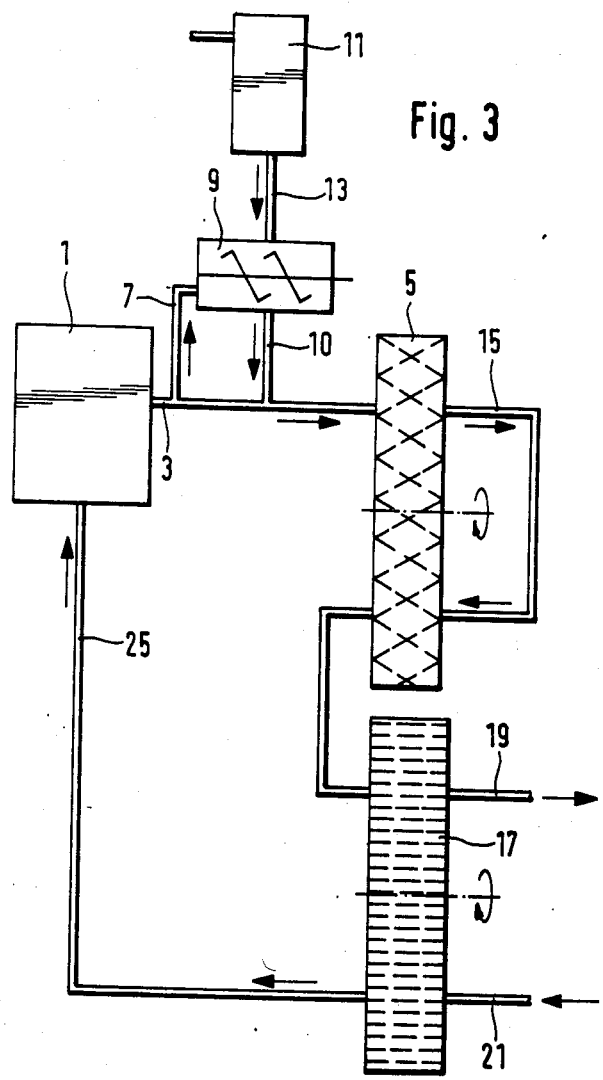

APPARATUS FOR CATALYTIC CLEANING OF EXHAUST GASES FROM A FURNACE SYSTEM

BACKGROUND OF THE INVENTION

The invention relates to a method and apparatus for selectively eliminating the oxides of nitrogen in the exhaust gases of furnace systems by introducing chemical compounds into the exhaust gases emerging from the furnace system for reaction with the oxides of nitrogen and by then passing the exhaust gases through a catalytic converter in order to accelerate and/or initiate the reaction, as well as to an apparatus for performing the method.

To selectively reduce the oxides of nitrogen, it is already known to meter out ammonia ($NH_3$) in vapor form, in a mixture with air and dissolved in water either with or without pressure, into the flow of exhaust gas emerging from the furnace system. By means of a blending section having appropriate fixtures, the object is to develop a uniform distribution of ammonia and a uniform temperature distribution inside the flue gas conduits attached thereto. The mixture is then passed through a catalytic converter connected to the inlet side of a rotary regenerative heat exchanger intended for transmitting the heat of the exhaust gas to the combustion air that is supplied to the furnace. The catalyst is embodied as a fixed-bed reactor, the flow of which is preferably directed vertically downward. A honeycomb structure with a vanadium compound as its catalytically active substance is contained in the reactor. The pressure loss of the fixed-bed reactor is taken into account when dimensioning the flue gas blower. The vertically downward flow in the reactor is intended to counteract solid contaminant deposits in the reactor, or to keep such deposits within limits. The deposits that do occur are intermittently removed by blowing, using compressed air or steam. Depending on the boiler, the mode of operation, and the composition of the coal that is used for fuel, the catalytic converters inside the reactor have a service life of over two years.

Based on the recognition that the conversion of the oxides of nitrogen, which occur in proportions of approximately 95% nitrogen monoxide and approximately 5% nitrogen dioxide, into molecular nitrogen and water does not depend solely upon the ratio of the quantity of ammonia that is introduced to the content of nitrogen oxide in the exhaust gases and upon the temperature level of the exhaust gases, but instead is substantially affected by the efficiency of the catalytic converter as well, it is the object of the invention to devise a method and an apparatus for selectively eliminating the oxides of nitrogen in furnace exhaust gases using a catalytic converter, in which the catalytic properties of the catalyst elements used are maintained over relatively long periods of operation.

SUMMARY OF THE INVENTION

With a method of the general type described at the outset above as the point of departure, this object is attained in accordance with the invention in that the catalytic converter experiences, in different zones, a flow of the exhaust gases that are to be catalytically treated and a flow of at least one cleaning gas, the latter preferably in countercurrent, and that the location of the catalyst segments through which the exhaust gases and the cleaning gas, respectively, flow is varied continuously or intermittently. Because the cleaning gas flow is continuously effective, the contaminants that settle out of the exhaust gas flow onto the surfaces of the catalyst element, especially in the vicinity of its inlet, and are carried along by the flow of the exhaust gas are removed from these surfaces again continuously; as a result, the efficiency of the catalytic converter remains unimpaired over substantially longer travel periods. A method in which the cleaning gas flow is moved in countercurrent to the exhaust gas entering the catalytic converter is particularly effective. The efficiency of the catalytic compound is apparently maintained because of the fact that poisoning of the catalysts depends directly on the length of time the contaminant is in contact with the catalyst elements, and that the proposed continuous cleaning of the catalyst elements by the continuously active cleaning gases shortens these contact times with the catalyst poisons considerably, as compared with the intermittent cleaning using blow pipes that has been the practice heretofore.

The apparatus for performing the method is preferably embodied such that the catalytic converter comprises catalyst elements disposed in a carrier, that the carrier and the gas connections are embodied such that they are rotatable relative to one another, and that a drive apparatus for the intermittent or continuous rotation of the carrier or gas connections is provided.

The catalytic converter may be connected in the flow of exhaust gas, on the inlet and/or outlet side of the storage element of a rotary regenerative heat exchanger intended for transmitting the heat of the exhaust gas to the combustion air that is to be supplied to the furnace system; that is, in some cases the catalytic converter may also be incorporated into the combustion air preheater, acting in its function as a heat exchanger.

A shared drive mechanism is suitably associated with the carriers of the catalyst element and of the storage elements of the regenerative heat exchanger; for instance, the carrier of the catalyst elements and the carrier of the storage elements may be coupled by a common shaft. Alternatively, the catalyst elements and the storage elements of the regenerative heat exchanger may also be disposed in a shared carrier, which then revolves inside a common housing. In that case the catalytic converter and the regenerative heat exchanger are combined into a single structural component.

The embodiment may also be such that the storage elements themselves are embodied, at least in part, as catalyst elements. In practical terms, the catalytic converter is then integrated into the regenerative heat exchanger, in that the storage element surfaces which during heat exchanger operation experience a flow over them of exhaust gases and combustion air are coated with one or more catalytically active compounds.

The catalyst elements may thus be plates or grids, preferably of metal, which are coated with catalytically active compounds; an intermediate carrier, acting as an adhesion promoter, may be provided underneath the catalytically active coating.

On the other hand, it is also possible to embody the catalyst elements or the intermediate carrier as an open-pored substrate, especially of ceramic material, which is provided with one or more catalytically active compounds.

Instead of relatively flat catalyst elements, these elements may also be embodied as pourable elements, which in a suitably embodied catalytic converter carrier form a poured bed through which the exhaust gases that are to be cleaned and the flow of cleaning gas can flow.

Instead of a coating, the catalyst elements can also contain the catalytically active compound or compounds in the form of an alloy ingredient or ingredients.

If the exhaust gases to be cleaned contain not only oxides of nitrogen but also other catalytically decomposable harmful ingredients, it may be advantageous for the catalytic converter to have a plurality of successive layers of catalyst elements in the axial direction, which are provided with different catalytically active compounds, each having a specific catalytic effect for particular contaminants or each having an optimal catalytic effect for a particular prevailing temperature level.

If the cleaning gas flow is not to be embodied by the combustion air itself that is to be supplied to the furnace system, but rather by a separate gas flow, which may also be embodied for instance by the previously cleaned exhaust gases, then it is recommended that the carrier of the heat exchanging and catalyst elements be provided, in the circumferential direction inside the enveloping housing, with an exhaust gas segment, an air segment, and a regeneration segment in which the reactivation of the catalytic compound or the air ejection of the decomposed catalyst poisons takes place.

BRIEF DESCRIPTION OF THE DRAWINGS

The invention is described in further detail in the ensuing description of three exemplary embodiments, referring to the drawing, in which:

FIG. 3 is a schematic diagram of a further exemplary embodiment, in which the cleaned exhaust gas itself is used as the cleaning gas flow for the catalytic converter, which in turn is disposed separately from the regenerative heat exchanger.

DETAILED DESCRIPTION

Figure 1:
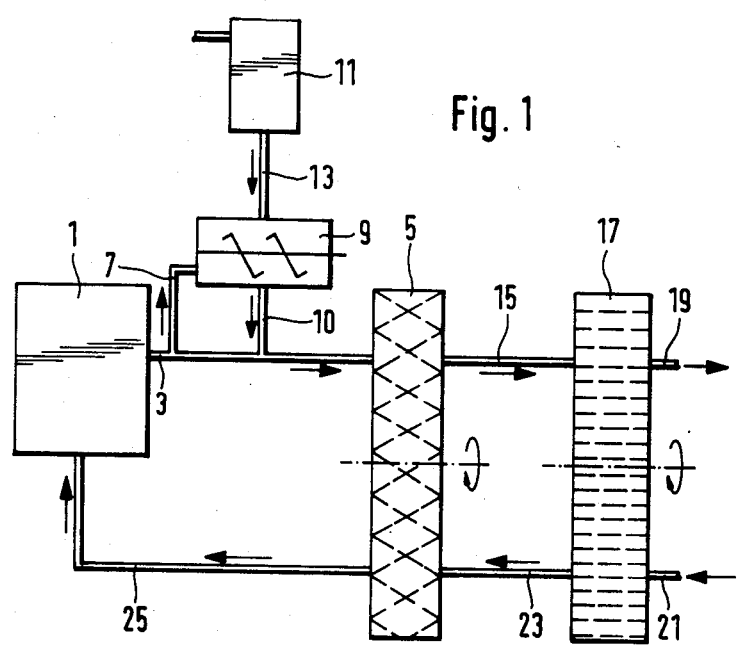
FIG. 1 is a schematic diagram of a furnace system having a catalytic converter and a regenerative heat exchanger connected to the outlet side.

In the system shown schematically in FIG. 1, the exhaust gases proceed from the furnace system 1 via a line 3 to a catalytic converter 5. From this exhaust gas line 3, a partial flow of the exhaust gases is diverted via a line 7 to a blending segment 9, into which a chemical compound (such as $NH_3$) is delivered from a supply container 11 via a line 13 and metered out into the partial flow of exhaust gas. Then the partial flow of exhaust gas is returned via the line 10 to the main flow of the exhaust gases and delivered to the catalytic converter 5 which operates either intermittently or continuously. The exhaust gases emerging from the catalytic converter, which carry water and nitrogen, then travel via the line 15 to the rotary regenerative heat exchanger 17 intended for transmitting the exhaust gas heat to the combustion air that is to be supplied to the furnace system 1. Following the rotary regenerative heat exchanger, the exhaust gases flow via the exhaust gas line 19 into the system (not shown) for precipitating out the sulfur compounds and reheating the gases for their entry into the exhaust gas chimney.

The combustion air supplied to the furnace system 1 first passes via the line 21 into the rotary regenerative heat exchanger 17, in which it is preheated in a countercurrent to the exhaust gases, and then passes via the line 23 to the catalytic converter 5 and—again in a countercurrent to the exhaust gases—flows through the catalytic converter, where it continuously blows the contaminants, previously deposited onto the surfaces of the catalyst elements, out of the exhaust gases and thereby prevents poisoning of the catalyst surfaces. From the outlet side of the catalytic converter, opposite the inlet side, the combustion air is delivered to the furnace system directly, via the line 25. In principle, separate drive mechanisms may be provided for the catalytic converter 5 and the regenerative heat exchanger 17. However, to reduce the cost of construction it is recommended that a common drive be associated with both units, for instance by driving the regenerative heat exchanger with a motor in the conventional manner and coupling the catalytic converter to the heat exchanger via a shaft.

Figure 2:
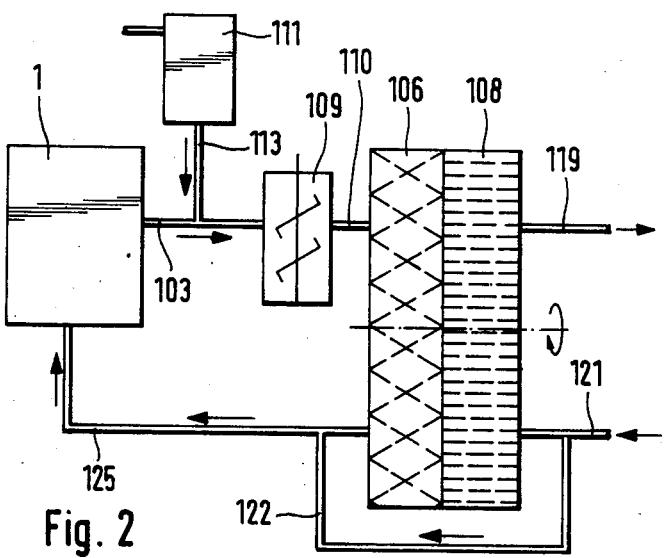
FIG. 2 is a schematic diagram of a modified furnace system, in which the catalytic converter and regenerative heat exchanger that follow it have been combined into a common structural unit.

In the embodiment according to FIG. 2, the exhaust gases emerging from the furnace system 1 and entering the exhaust gas line 103 are delivered in their entirety to a blending segment 109. Upstream of the blending segment, the chemical compound is introduced from a supply container 111 via the line 113 and is distributed further among the exhaust gases inside the blending segment. Via the exhaust gas line 110 connected to the blending segment, the flow of exhaust gas first reaches the catalyst bed 106, and after leaving it passes directly into the storage element 108 of the regenerative heat exchanger. Differing from the embodiment shown in FIG. 1, the storage element carrier of the continuously rotating regenerative heat exchanger is thus embodied simultaneously as the carrier of the catalyst bed, so that the catalyst bed and the storage element are driven inside a housing enveloping them in common and are there acted upon by the exhaust gases and the combustion air in countercurrent fashion. After leaving the storage element, the gases are delivered in the conventional manner via the line 119 to an exhaust gas cleaning system in order to eliminate the sulfur compounds, perhaps using a preceding filter, and then, after reheating, are carried away via the chimney.

The combustion air is delivered via a line 121, in a countercurrent to the exhaust gases, through the storage element and then through the catalyst bed 106. From the combustion air line 121, prior to the entry into the storage element, a partial flow is diverted and carried via the line 122 into a line 125, bypassing the combined catalytic converter and heat exchanger; in the line 125, the main flow of the combustion air flows from the catalytic converter and heat exchanger to the furnace system 1.

The exemplary embodiment shown in FIG. 3 corresponds to a certain extent to that shown in FIG. 1, and identical parts of the system are provided with identical reference numerals; thus it will suffice herein to explain only those selected connections which are different. The catalytic converter 5 and the regenerative heat exchanger 17 are again embodied as separate units. Differently from the first exemplary embodiment, however, the exhaust gas flow emerging from the catalytic converter 5 into the line 15 is returned in countercurrent, as a cleaning gas flow, through the catalytic converter 5 and only then is delivered to the regenerative heat exchanger 17 for heating the combustion air. The combustion air delivered to the heat exchanger via the line 21, contrarily, after being heated is delivered directly to the furnace system 1 via the line 25; that is, in this case the combustion air is not used for cleaning or regenerating the catalytic converter 5.

It will be appreciated that modifications and further developments of the described exemplary embodiments can be realized within the scope of the inventive concept. For instance, the catalytic converter of the exemplary embodiment of FIG. 1, like that of FIG. 3, can be provided with a stepping drive separate and independent from the drive of the heat exchanger 17; the stepping drive indexes the various segments, through which the exhaust gases and the cleaning gas flow, at certain time intervals.

In the exemplary embodiment according to FIG. 2, the integration of the catalytic converter with the heat exchanger can be increased still further by providing that the storage elements of the heat exchanger are themselves coated with a catalytically active compound; that is, the storage elements themselves simultaneously act as catalyst elements. Furthermore, deviating from the described exemplary embodiments, the catalytic converter can also be connected to the outlet side of the heat exchanger, if that should be desired in order to avoid high reaction temperatures in the catalytic converter.

It should also be noted that the term "catalytically active compound" is not to be considered limited to compounds in the chemical sense, but also encompasses pure elements and mixtures of such elements, so long as they produce the required catalytic effect.

I claim:

1. Apparatus for selectively eliminating oxides of nitrogen in exhaust gases of furnace systems, comprising:
   a rotary catalytic converter having catalyst elements disposed in a movable carrier;
   exhaust gas connection means for supplying exhaust gases emerging from a furnace system to said catalytic converter in a first direction; chemical feed means and blending means coupled to said exhaust gas connection means upstream of said catalytic converter for introducing and blending at least one chemical compound with said exhaust gas emerging from a furnace system prior to said exhaust gases reaching said catalytic converter;
   a cleaning gas connection means coupled to said catalytic converter for introducing at least one cleaning gas flow into said catalytic converter countercurrent to the exhaust gas flow through said catalytic converter;
   said catalytic converter having a first zone through which said exhaust gases flow, and a second zone through which said at least one cleaning gas flows; and
   rotatable drive means coupled to said carrier for moving said carrier of said catalytic converter relative to said exhaust and cleaning gas connection means such that said carrier is rotatable relative to said exhaust and cleaning gas connection means to thereby vary the location of catalytic converter segments through which the exhaust gases flow and through which the current of cleaning gas flows.

2. The apparatus of claim 1, wherein said drive means includes means for continuously moving said carrier relative to said exhaust and cleaning gas connection means.

3. The apparatus of claim 1, wherein said drive means includes means for intermittently moving said carrier relative to said exhaust and cleaning gas connection means.

4. The apparatus of claim 1, wherein said catalytic converter comprises a plurality of successive layers of catalyst elements in the axial direction thereof, said layers being provided with different catalytically active compounds.

5. The apparatus of claim 1, further comprising a rotary regenerative heat exchanger having a storage element, and wherein said catalytic converter is coupled, in the flow of exhaust gases, to said storage element of said rotary regenerative heat exchanger for transmitting exhaust gas heat to combustion air that is to be supplied to the furnace system.

6. The apparatus of claim 5, wherein a common drive means is coupled to both said carrier of said catalytic converter and said storage element of said rotary regenerative heat exchanger to simultaneously move said carrier and said storage element.

7. The apparatus of claim 6, wherein said carrier of said catalytic converter and said storage element of said rotary regenerative heat exchanger are coupled together by means of a common shaft to said common drive means.

8. The apparatus of claim 5, wherein said carrier of said catalytic converter and said storage element of said rotary regenerative heat exchanger comprise a common carrier means.

9. The apparatus of claim 8, wherein said storage element of said rotary regenerative heat exchanger at least in part simultaneously serves as a carrier for catalyst elements.

10. The apparatus of claim 5, wherein said catalytic converter is coupled to an inlet side of said storage element.

11. The apparatus of claim 5, wherein said catalytic converter is coupled to an outlet side of said storage element.

12. The apparatus of claim 5, wherein said rotary regenerative heat exchanger comprises a housing and heat exhanging elements mounted on a carrier mounted within said housing, said rotary regenerative heat exchanger housing also containing said rotary catalytic converter, said rotary regenerative heat exchanger defining, inside said housing, in the circumferential direction thereof, an exhaust gas segment, an air segment and a regeneration segment.

13. The apparatus of claim 1, wherein said catalyst elements comprise plates coated with a catalytically active compound.

14. The apparatus of claim 13, further compising an intermediate layer provided between said metal plates and said catalytically active coating compound.

15. The apparatus of claim 1, wherein said catalyst elements comprise grids coated with a catalytically active compound.

16. The apparatus of claim 15, further comprising an intermediate layer provided between said grids and said catalytically active coating compound.

17. The apparatus of claim 1, wherein said carrier comprises an open-pored substrate carrying at least one catalytically active compound.

18. The apparatus of claim 17, wherein said open-pored substrate is a ceramic substrate.

19. The apparatus of claim 1, wherein said catalyst elements comprise open-pored substrates which carry at least one catalytically active compound.

20. The apparatus of claim 19, wherein said open-pored substrates are ceramic substrates.

21. The apparatus of claim 1, wherein said catalyst elements are pourable elements.

22. The apparatus of claim 21, wherein said pourable elements comprise metallic elements provided with a catalytically active coating.

23. The apparatus of claim 22, comprising an intermediate layer between said metallic elements and said catalytically active coating.

* * * * *